United States Patent [19]
Jacquemet et al.

[11] Patent Number: 5,986,005
[45] Date of Patent: Nov. 16, 1999

[54] COMPOSITION INCLUDING A FLUOROELASTOMER AND A THERMOPLASTIC POLYAMIDE AND RESULTING FILM

[75] Inventors: Regis Jacquemet, Evreux; Jean-Jacques Labaig, Bernay; Joachim Merziger, Nevers, all of France

[73] Assignee: Elf Atochem S.A., France

[21] Appl. No.: 08/894,622

[22] PCT Filed: Dec. 20, 1996

[86] PCT No.: PCT/FR96/02050

§ 371 Date: Nov. 17, 1997

§ 102(e) Date: Nov. 17, 1997

[87] PCT Pub. No.: WO97/23570

PCT Pub. Date: Jul. 3, 1997

[30] Foreign Application Priority Data

Dec. 22, 1995 [FR] France ................................. 95 15352

[51] Int. Cl.⁶ .............................. C08L 77/02; C08L 27/12

[52] U.S. Cl. ......................... 525/178; 525/179; 525/184; 525/187; 428/474.5

[58] Field of Search ..................................... 525/178, 179, 525/184, 187; 428/474.5

[56] References Cited

U.S. PATENT DOCUMENTS

| | | |
|---|---|---|
| 3,334,157 | 8/1967 | Larsen . |
| 4,115,475 | 9/1978 | Foy et al. ................................. 525/408 |
| 4,195,015 | 3/1980 | Deleens et al. ........................ 528/170 |
| 4,230,836 | 10/1980 | Canterino ................................ 525/332 |
| 4,331,786 | 5/1982 | Foy et al. ................................ 525/408 |
| 4,332,920 | 6/1982 | Foy et al. ................................ 525/408 |
| 4,839,441 | 6/1989 | Cuzin et al. ........................... 528/328 |
| 4,855,360 | 8/1989 | Duchesne .............................. 525/187 |
| 4,863,983 | 9/1989 | Johnson et al. ....................... 524/140 |
| 4,864,014 | 9/1989 | Cuzin et al. ........................... 528/279 |
| 4,983,677 | 1/1991 | Johnson et al. ....................... 525/127 |
| 5,015,693 | 5/1991 | Duchesne ............................... 525/187 |
| 5,304,422 | 4/1994 | Tanabe et al. ......................... 428/392 |

FOREIGN PATENT DOCUMENTS

| | | |
|---|---|---|
| 0 432 911 | 6/1991 | European Pat. Off. ................ 27/12 |
| 0 626 424 | 6/1994 | European Pat. Off. ................ 27/12 |
| 2 168 332 | 8/1973 | France ................................... 29/20 |
| WO 91/05007 | 4/1991 | WIPO . |
| WO 95/01396 | 1/1995 | WIPO ...................................... 23/4 |
| WO 95/11940 | 5/1995 | WIPO ..................................... 27/12 |

*Primary Examiner*—P. Hampton-Hightower
*Attorney, Agent, or Firm*—Bell, Boyd & Lloyd

[57] ABSTRACT

The present invention relates to a modifier composition, a stock mixture and a final composition comprising a fluoro elastomer and a thermoplastic polyamide, as well as to the film obtained from the final composition.

5 Claims, No Drawings

COMPOSITION INCLUDING A FLUOROELASTOMER AND A THERMOPLASTIC POLYAMIDE AND RESULTING FILM

FIELD OF THE INVENTION

The present invention relates to a composition comprising a fluoro elastomer and a thermoplastic polyamide, which is intended to improve the use of plastics. The invention also relates to a composition based on hydrocarbon polymers comprising a fluoro elastomer and a thermoplastic polyamide. The present invention moreover relates to a homogeneous thermoplastic film having improved optical and mechanical properties and comprising modifiers such as a fluoro elastomer and a thermoplastic polyamide.

BACKGROUND OF THE INVENTION

It is generally accepted that during the extrusion of plastic, irregularities in the flow appear at the die outlet when a critical shear rate is exceeded. Below this rate, the extrudates are smooth, whereas, above this critical rate, surface defects are observed. These defects, which are referred to as "melt fracture", are in several forms. At a shear rate slightly above the critical rate, the films obtained by extrusion-blow moulding lose their transparency and their sheen. For markedly higher rates, which correspond to a higher production efficiency, homogeneity defects with smooth zones in a rough surface appear. These defects significantly decrease the optical and mechanical properties of the film. The same phenomena may be observed on extruded rods. When the surface of the rods loses its sheen and becomes dull and rough, it is often compared to an "orange skin".

Among the various solutions proposed to overcome this drawback, the use of modifiers is of greater value industrially. Thus, in U.S. Pat. No. 3,334,157, the incorporation of polytetrafluoroethylene improves the optical properties of the polyethylene film. According to U.S. Pat. Nos. 4,855,360 and 5,015,693, a fluoro elastomer in combination with a polyoxyalkylene is used to improve the conversion of hydrocarbon polymers. Organophosphates or organophosphites in combination with a fluoro elastomer have been described in U.S. Pat. Nos. 4,983,677 and 4,863,983 in order also to improve the conversion of hydrocarbon polymers.

However, additives such as anti-blocking agents, fillers, pigments, dyes and stearates, which are essential for the conversion of plastics, interact with these fluoro elastomers and significantly reduce their efficacy. To attempt to overcome this drawback, one process consisting in firstly treating the extruder die with modifiers and then in converting the plastics has been described in patent WO 91/05007. The modifier used contains a functionalized fluoro copolymer comprising tetrafluoroethylene units and a functional group containing a fluoro monomer. This process has the drawback of taking place in two steps.

DESCRIPTION OF THE INVENTION

A composition has now been found which improves the conversion of plastics, during their use by extrusion, without, however, having the drawbacks mentioned above. This composition comprising a fluoro elastomer and a thermoplastic polyamide forms the subject of the present invention.

The present invention makes it possible not only to shift the "melt fracture" towards high shear rates but also to obtain homogeneous films with a reduced period of establishing the extruder conditions.

The present invention thus provides a composition of modifiers for improving the conversion of plastics, characterized in that it comprises (a) a fluoro elastomer and
(b) a thermoplastic polyamide.

The thermoplastic polyamides are polymers containing polyamide blocks and polyether blocks.

The polymers containing polyamide blocks and polyether blocks result from the copolycondensation of polyamide sequences containing reactive ends with polyether sequences containing reactive ends, such as, inter alia:

1) Polyamide sequences containing diamine chain ends with polyoxyalkylene sequences containing dicarboxylic chain ends.
2) Polyamide sequences containing dicarboxylic chain ends with polyoxyalkylene sequences containing diamine chain ends obtained by cyanoethylation and hydrogenation of alpha-omega-dihydroxy aliphatic polyoxyalkylene sequences, known as polyether diols.
3) Polyamide sequences containing dicarboxylic chain ends with polyether diols, the products obtained being, in this specific case, polyetheresteramides.

The polyamide sequences containing dicarboxylic chain ends originate, for example, from the condensation of alpha-omega-aminocarboxylic acids of lactams or of dicarboxylic acids and diamines in the presence of a chain-limiting dicarboxylic acid. Advantageously, the polyamide blocks are made of polyamide-12 or of polyamide-6.

The number-average molar mass $\overline{Mn}$ of the polyamide sequences is between 300 and 15,000 and preferably between 600 and 5000. The mass $\overline{Mn}$ of the polyether sequences is between 100 and 6000 and preferably between 200 and 3000.

The polymers containing polyamide blocks and polyether blocks may also comprise randomly distributed units. These polymers may be prepared by the simultaneous reaction of the polyether and the polyamide block precursors.

For example, polyether diol, a lactam (or an alpha-omega-amino acid) and a chain-limiting diacid may be reacted together in the presence of a small amount of water. A polymer having essentially polyether blocks, polyamide blocks of very variable length, and also the various reactants which have reacted randomly and are distributed statistically along the polymer chain, are obtained.

Whether they originate from the copolycondensation of polyether and polyamide sequences prepared beforehand or from a one-step reaction, these polymers containing polyamide blocks and polyether blocks have, for example, Shore D hardnesses which may be between 20 and 75 and advantageously between 30 and 70 and an intrinsic viscosity of between 0.8 and 2.5, measured in meta-cresol at 250° C. for an initial concentration of 0.8 g/100 ml.

Whether the polyether blocks are derived from polyethylene glycol, from polyoxypropylene glycol or from polyoxytetramethylene glycol, they are either used in their natural state and copolycondensed with polyamide blocks containing carboxylic ends or they are aminated in order to be converted into polyether diamines and condensed with polyamide blocks containing carboxylic ends. They may also be mixed with polyamide precursors and a chain-limiting agent in order to make polymers containing polyamide blocks and polyether blocks having randomly distributed units.

Polymers containing polyether and polyamide blocks are described in U.S. Pat. Nos. 4,331,786, 4,115,475, 4,195,015, 4,839,441, 4,864,014, 4,230,838 and 4,332,920.

The polyether may be, for example, a polyethylene glycol (PEG), a polypropylene glycol (PPG) or a polytetramethylene glycol (PTMG). The latter is also known as polytetrahydrofuran (PTHF).

Whether the polyether blocks are in the chain of the polymer containing polyamide blocks and polyether blocks in the form of diols or of diamines, they are referred to for simplicity as PEG blocks or as PPG blocks or alternatively as PTMG blocks.

It would not constitute a departure from the scope of the invention if the polyether blocks contained different units such as units derived from ethylene glycol, from propylene glycol or from tetramethylene glycol.

Preferably, the polymer containing polyamide blocks and polyether blocks comprises only one type of polyamide block and only one type of polyether block. Polymers containing PA-12 blocks and PEG blocks, polymers containing PA-12 blocks and PTMG blocks and polymers containing PA-6 blocks and PEG blocks are advantageously used.

Advantageously, the polymer containing polyamide blocks and polyether blocks is such that the polyamide which is in block form and that which may be distributed randomly in the chain represents 50% by weight or more of the polymer containing polyamide blocks and polyether blocks. Advantageously, the amount of polyamide and the amount of polyether are in the ratio (polyamide/polyether) 2/3 to 3/1 and preferably close to 1/1.

The polymer containing polyamide blocks and polyether blocks having hydrophilic properties is particularly preferred, that is to say the one having PEG blocks or in which the polyether blocks have a majority of units derived from ethylene oxide.

Thus, the films of the invention are antistatic.

The fluoro elastomers may be in powder or granule form. They are generally homopolymers or copolymers of fluoro olefins in which the fluorine/carbon ratio is greater than or equal to 0.5. A fluorine/carbon atom ratio close to 1 is particularly preferred.

Among the homopolymers, mention may be made of polyvinylidene fluoride or polyvinyl fluoride.

The copolymers advantageously chosen are derived from vinylidene fluoride and have one or more fluoro olefins.

The fluoro elastomers which are particularly preferred are copolymers of vinylidene fluoride and of propylene hexafluoride. Advantageously, copolymers containing more than 50 mol % of vinylidene fluoride are used.

According to the invention, it is possible either to use the modifier compositions in their natural state or to dilute them in a polymer or a mixture of polymers in order to form stock mixtures. The stock mixture advantageously consists of a plastic of the same type as that which it is desired to modify, and the fluoro elastomer and the polyamide are incorporated therein. The expression plastic of the same type is understood to refer to materials essentially comprising the same monomers in similar proportions. Polymers whose viscosity is close to that of the plastic to be extruded are particularly preferred.

These stock mixtures may also contain fillers, in particular antioxidants (in the following text, except where otherwise indicated, the percentages are given by weight).

The dilution of the modifier compositions is such that the content of fluoro elastomer in these stock mixtures is generally greater than 0.1% and preferably between 0.3% and 5% by weight and the content of thermoplastic polyamide is generally greater than 0.1% and preferably 0.3 to 20%.

These stock mixtures may be used to pretreat the extruder outlet die or they may be mixed with the plastics to be converted before or during the conversion. Advantageously, the stock mixture is diluted in the first plastic before conversion to form a final composition.

The final compositions comprising a fluoro elastomer, a thermoplastic polyamide and the plastic to be extruded form another subject of the invention. They may also contain anti-blocking agents, for example silica, pigments such as titanium dioxide, and stearates.

The term plastic is understood to refer to polymers comprising olefin units such as, for example, ethylene, propylene, 1-butene, etc. units.

By way of example, mention may be made of:

polyethylene, polypropylene and copolymers of ethylene with alpha-olefins, it being possible for these products to be grafted with unsaturated carboxylic acid anhydrides such as maleic anhydride or unsaturated epoxides such as glycidyl methacrylate.

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their hemiesters and their anhydrides, and (iv) unsaturated epoxides, it being possible for these ethylene copolymers to be grafted with unsaturated dicarboxylic acid anhydrides or unsaturated epoxides.

optionally maleic-treated styrene/ethylene-butene/styrene (SEBS) block copolymers.

Mixtures of two or more of these polyolefins may be used. The following are advantageously used:

polyethylene, copolymers of ethylene and of an alpha-olefin and preferably low density copolymers (LDPE) and, even better, linear low density copolymers (LLDPE), copolymers of ethylene/of an alkyl (meth)acrylate, copolymers of ethylene/of an alkyl (meth)acrylate/of maleic anhydride, the maleic anhydride being grafted or copolymerized, copolymers of ethylene/of an alkyl (meth)acrylate/of glycidyl methacrylate, the glycidyl methacrylate being grafted or copolymerized, polypropylene.

The amount of fluoro elastomer present in the final composition may be greater than 10 ppm and preferably between 100 ppm and 1000 ppm.

The amount of thermoplastic polyamide present in the final composition may vary within a wide range. It is generally between 10 ppm and 5% and preferably between 100 ppm and 1%.

The final compositions according to our invention may be converted by any known means, for example injection, extrusion, extrusion-blow moulding of hollow substances and extrusion-blow moulding of film.

Another subject of the invention relates to a thermoplastic film obtained by extrusion-blow moulding of the final compositions described above. This homogeneous film, having improved optical and mechanical properties, is characterized in that it comprises a fluoro elastomer and a thermoplastic polyamide. This film also has the advantage of being antistatic.

The film according to the invention may be obtained for a period of establishing the extruder conditions of less than 2 hours, preferably for a period of less than or equal to one hour.

EXAMPLES

The examples which follow illustrate the invention without limiting it.

The plastic used is PEbdl LL0209 AA from BP, a linear low density polyethylene which is a copolymer comprising butene units and mainly ethylene units with an MI (Melt Index) at 2.16 kg and 190° C.=0.9 and a density=0.92

Kynar 2821—copolymer comprising 88% by weight of vinylidene difluoride and 12% by weight of propylene hexafluoride.

Pebax M: thermoplastic polyamide consisting of PA-12 of $\overline{Mn}$=1500 and PEG blocks of $\overline{Mn}$=1500 and of Shore D hardness 40.

The stock mixtures are obtained either by mechanical mixing of the various modifiers, additives and polymers or by mixing in a Buss PR 46/70 11D blender. In this case, the temperature profile is 170° C. –195° C.–200° C. and the die temperature is equal to 210° C.

The stock mixtures are then diluted in PEbdl LL0209 AA by simple mechanical mixing with optional addition of additives in order to give the final compositions.

Evaluation of the modifiers in the final compositions was made using two types of extruder:

a) The Haake extruder

The Haake Rheolex extruder has a screw diameter equal to 30 mm and an active screw length equal to 25 times its diameter. The compression rate of the extruder is equal to 3. The diameter of the die is 3 mm and its length is 3 times its diameter. The angle to the die inlet is 180°.

The temperature profile of the extruder

190° C.–200° C.–210° C.–220° C.–225° C.

is constant for all the tests, and similarly for the die temperature, which is equal to 215° C.

b) The Kaufman extruder

The Kaufman extruder converts the final compositions by extrusion-blow moulding of film. The characteristics of the extruder and of its die are given in Table 1. The various zones of the extruder screw are presented in Table 2. The temperature profile of the various zones, which is given in Table 3, is constant for all the tests.

TABLE 1

Characteristics of the Kaufman line

| CHARACTERISTIC | VALUE |
|---|---|
| EXTRUDER | |
| diameter | 63.5 mm |
| length | 28 D |
| compreesion rate | 2.6 |
| DIE | |
| diameter | 150 mm |
| spiral mandrel | 3 channels |
| land | 20 mm |
| gap | 0.8 mm |

TABLE 2

Zones of the Kaufman screw

| ZONE | LENGTH [D] |
|---|---|
| supply | 6.5 |
| compression | 7 |
| transportation | 6.5 |
| blending | 3 |
| decompression | 4.5 |
| slug-blender | 1.5 |

TABLE 3

Temperature profile of the Kaufman line

| EXTRUDER | | | | ADAPTER | | | DIE | | |
|---|---|---|---|---|---|---|---|---|---|
| 190° C. | 200° C. | 210° C. | 210° C. | 200° C. | 200° C. | 210° C. | 210° C. | 205° C. | 200° C. |

The optical and mechanical properties of the film obtained by extrusion-blow moulding of film using the Lumaquitaine test and the Dart test, respectively.

The Lumaquitaine test consists in forming, through a system of lenses, the image of the fixed slot of a collimator, illuminated by a light source. This image is received on a moving sinusoidal transparency window or "sight" associated with a recording photometer.

A test sample of the film having a circular working part 20 mm in diameter is placed in a sample holder which may be rotated, located on the optical axis of the system between the collimator and the sight, in a parallel light beam.

The curve of variation in intensity of the modulated transmitted light by the shift of the sight is recorded.

If M in millimeters is the distance separating the baseline of the maxima and m in millimeters the distance separating the baseline of the minima from the corresponding sinusoidal curve, the contrast factor which makes it possible to determine, for each wave number, the attenuation due to the film is given by the following formula:

$$C\% = \frac{M-m}{M+m} \times 100$$

The Dart test is a method which consists in determining the energy required to break a plastic film by impact, under the effect of a punch with a mass less than or equal to 300 g falling freely from a height of 66 cm.

The mass of the projectile, for which 50% of the test pieces (at least 10) from the same test sample are broken under the conditions described in the above paragraph, is determined.

The mass of the projectile is defined as being the mass of the punch increased by the additional masses and by the mass of the blocking collar of these masses.

The mass of the projectile is varied so as to obtain both broken test pieces and intact test pieces in the same group of 10 test pieces and with at least 3 different levels of breaking between 0% and 100%.

The impact-breaking mass $W_f$ of the film is expressed in grams according to the formula below:

$$W_f = W_1 - \Delta W[S/100 - 0.5]$$

where $W_1$ is the lowest projectile mass (in grams) used for which all the test pieces are broken, ΔW is the increase in mass used successively from one test to another (in grams)

S is the sum of the breaking percentages for each projectile mass (this sum comprises the percentages corresponding to all the projectile masses used, from the mass corresponding to no breaking to the mass $W_1$ inclusive).

The antistatic properties of the film are evaluated by a method based on the ability of a surface to leak static charge. This method consists firstly in charging the surface of the film by means of high voltage for a few seconds. After cutting off the source of high voltage, the half-discharge time, which is the time required to pass from the maximum potential $V_{max}$ reached to half of this value $V_{max}/2$, is noted. An antistatic material will leak charge more readily and the half-discharge time will consequently be shorter.

b) Course of the tests:
(i) establishment of the extruder conditions with PEbdl LL0209 AA,
(ii) starting of the extrusion with the final compositions
(iii) setting of extrusion and sampling parameters
   a) Haake Rheolex extruder pressure and temperature at the die inlet the value of the couple, of the flow rate and of the swelling
   for different spin speeds (20 to 80 revolutions/min)
   b) Kaufman extruder pressure before and after filtering (bar) die temperature (° C) intensity (A) cooling rate (%) and draw speed (m/min)
   at the start of the test and after every hour
(iv) purging of the Haake Rheolex extruder with PEbdl LL0209 AA. Dismantling and cleaning of the die in a bath of acetone.
   purging of the Kaufman extruder with Polybatch KC30 from Schulman (stock mixture based on polyethylene comprising 50% by weight of additives and a density=1.38) with MI at 2.16 kg and 190° C.=1.3
   purging of the Kaufman die and sleeve using Lacqrene 1260 polystyrene crystal with an MI at 5 kg and 200° C.=4 and a density=1.05
(v) extruder is ready for a new test For all of the tests carried out on the Kaufman extruder, the spin speed of the screw is 35 revolutions/min, a draw speed=8.5 m/min and the extruder is adjusted to give:
a film width=500 mm
a film thickness=50 $\mu$m Example 1

A final composition containing only the plastic (PEbdl LL0209 AA) to be converted is used.

This final composition is converted into a rod using the Haake Rheolex extruder. The parameters and samples (Table 4) were noted one hour after starting the extrusion at a screw spin speed of 20 revolutions/mmn and at a die temperature equal to 215° C.

A film is obtained by extrusion-blow moulding of film using the Kaufman extruder.

The appearance of the rod and film thus obtained is reported in Table 4.

Example 2

A stock mixture of the composition below is diluted to a level of 2%:

| | |
|---|---|
| PEbdl LL0209 AA powder | = 97.9% |
| Kynar 2821 | = 2.0% |
| Irganox B 900 (antioxidant) | = 0.1% | in the plastic (PEbdl LL0209 AA) to be converted.

The final composition thus obtained contains:

| | |
|---|---|
| PEbdl LL0209 AA powder | = 99.958% |
| Kynar 2821 | = 0.04% |
| Irganox B 900 (antioxidant) | = 0.002% |

This final composition is converted in an identical manner to that of Example 1.

Example 3

A final composition is prepared in an identical manner to that of Example 2, except that 2% of MMF15C from Schulmann, containing about 15% natural silica, are added.

The final composition contains:

| | |
|---|---|
| PEbdl LL0209 AA powder | = 99.658% |
| Kynar 2821 | = 0.04% |
| Irganox B 900 (antioxidant) | = 0.002% |
| Silica | = 0.3% |

The final composition is converted in an identical manner to that of Example 2.

Example 4

A final composition is prepared in an identical manner to that of Example 3, except that 2% of MMF15C are replaced by 4% of MM CMPF 59080 from Synthecolor containing 2% Erucamide antislip agent.

The final composition contains:

| | |
|---|---|
| PEbdl LL0209 AA powder | = 99.958% |
| Kynar 2821 | = 0.04% |
| Irganox B 900 (antioxidant) | = 0.002% |
| MM CMPF 59080 | = 4% |

The final composition is converted in an identical manner to that of Example 2.

TABLE 4

| Example No. | Kynar ppm | Additives ppm | Haake Rheolex extruder | | | | | Kaufman extruder |
|---|---|---|---|---|---|---|---|---|
| | | | Pressure (bar) | Couple (N m) | Flow rate (kg/h) | Swelling | Appearance | Contrast factor % |
| 1 | — | — | 79 | 81 | 3039 | 1602 | opaque rod, waves | 20.5 |
| 2 | 400 | — | 70 | 69 | 3086 | 1681 | transparent rod, smooth and shiny | 93.5 |
| 3 | 400 | 3000 natural silica | 75 | 74 | 2990 | 1631 | opaque rod, orange-skin and waves | 71.5 |
| 4 | 400 | 800 erucamide | 72 | 66 | 2904 | 1645 | opaque rod, smooth and rough in one zone | 93.6 |

Example 5

The final composition of Example 2 is taken again and its behaviour as a function of time is studied during extrusion-blow moulding of film on the Kaufman extruder. The parameters noted and the appearance of the film obtained are reported in Table 5.

Example 6

Examples 6 to 8 were carried out on the Kaufman extruder.
MM 29790 PG=antioxidant (Santonox)
A final composition is prepared from a stock mixture containing

| PEbdl LL0209 AA (granules) | 97.7% |
|---|---|
| Kynar 2821 | 2.0% |
| MM 29790 PG | 0.3% | which is diluted to a level of 2% in the plastic (PEbdl LL0209 AA) to be converted and to which 2% of MMF15C from Schulmann are added.
The final composition thus obtained contains

| PEbdl LL0209 AA | 97.954% |
|---|---|
| Silica | 0.3% |
| Kynar 2821 | 0.04% |
| MM 29790 PG | 0.006% |
| PE (polyethylene) | 1.7% |

Example 7

The process is performed in an identical manner to Example 6, except that the stock mixture used also contains 4% of Pebax M.

The final composition contains

| PEbdl LL0209 AA | 97.874% |
|---|---|
| Silica | 0.3% |
| Pebax M | 0.08% |
| Kynar 2821 | 0.04% |
| MM 29790 PG | 0.006% |
| PE(polyethylene) | 1.7% |

Example 8

The process is performed in an identical manner to that of Example 7, except that the stock mixture contains 8% of Pebax M instead of 4%.

The final composition contains

| PEbdl LL0209 AA | 97.794% |
|---|---|
| Silica | 0.3% |
| Pebax M | 0.16% |
| Kynar 2821 | 0.04% |
| MM 29790 PG | 0.006% |
| PE (polyethylene) | 1.7% |

The optical and mechanical properties of the film obtained, as a function of the period of establishment of the extruder conditions, are represented in Tables 6 and 7, respectively.

The PE(polyethylene) originates from the stock mixtures MM F 15C and MM1 29790 PG.

TABLE 5

FILM-EXTRUSION OF PEBD BP LL 0209 WITH 400 ppm OF KYNAR 2821

| TIME [h] | FRONT PRESSURE [bar] | BACK PRESSURE [bar] | T° [° C.] | INTENSITY [A] | FLOW RATE [kg/h] | APPEARANCE |
|---|---|---|---|---|---|---|
| 0 | 380 | 380 | 245 | 70 | — | melt fracture |
| 1 | 349 | 344 | 243 | 66 | — | small white bands without melt fracture |
| 2 | 340 | 340 | 240 | 65 | — | no defects |
| 3 | 337 | 335 | 242 | 64 | — | no defects |
| 4 | 338 | 333 | 242 | 64 | 26.7 | no defects |

TABLE 6

| Period of establishment of the extruder conditions (hours) | Contrast factor in % | | |
|---|---|---|---|
| | Example 6 | Example 7 | Example 8 |
| 0 | 20 | 20 | 20 |
| 1 | 63 | 71 | 80 |
| 2 | 70 | 70 | 75 |
| 3 | 75 | 74 | 76 |

TABLE 7

| Period of establishment of the extruder conditions (hours) | 50% breaking mass (g) | | |
|---|---|---|---|
| | Example 6 | Example 7 | Example 8 |
| 0 | 174 | 174 | 174 |
| 1 | 174 | 188 | 191 |
| 2 | 183 | 187 | 192 |
| 3 | 190 | 193 | 193 |

By noting the parameters in order to obtain the contrast factor at different points (25) of the film obtained by extrusion-blow moulding of film of the final compositions of Examples 6 to 8, we can deduce the homogeneity of the film.

Thus, Tables 8 and 9 show that the film obtained by extrusion-blow moulding of film of a final composition comprising a fluoro elastomer and a thermoplastic polyamide is more homogeneous than a film obtained by conversion of a final composition comprising only a fluoro elastomer.

TABLE 8

| Homogeneity of the film after one hour of establishing the extruder conditions. | | | |
|---|---|---|---|
| Contrast factor % | 30–50 | 50–65 | 65–80 |
| Example 6 | 2 | 12 | 11 |
| Example 7 | 0 | 1 | 24 |
| Example 8 | 0 | 0 | 25 |

TABLE 9

| Homogeneity of the film after two hours of establishing the extruder conditions. | | | |
|---|---|---|---|
| Contrast factor % | 40–55 | 60–70 | 70–85 |
| Example 6 | 2 | 1 | 22 |
| Example 7 | 0 | 5 | 20 |
| Example 8 | 0 | 0 | 25 |

Moreover, the antistatic nature of the film obtained from the compositions of Examples 6 and 8 was evaluated according to the method described above. Thus, the half-discharge time of the film obtained in Example 6 is 169 seconds, whereas a composition of PEbdl comprising 400 ppm of Kynar and 1600 ppm of Pebax (Example 8) leads to a film whose half-discharge time is reduced to 18 seconds.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A composition for improving the conversion of hydrocarbon polymers, comprising:
   (a) a fluoro elastomer; and
   (b) a thermoplastic polyamide,
   wherein (a) and (b) are diluted in a hydrocarbon polymer, the content of (a) being between 0.3 and 5%, the content of (b) being between 0.3 and 20%, these percentages being by weight of the hydrocarbon polymer and (a) and (b) combination.

2. The composition of claim 1, wherein (a) is a copolymer containing more than 50 mol % of vinylidene fluoride and (b) is a polymer containing polyamide blocks and polyether blocks.

3. The composition of claim 1, wherein the hydrocarbon polymer to be converted is a polyethylene homo- or copolymer.

4. A film comprising the composition of claim 1.

5. A method for molding comprising coextrusion-blow molding a film containing the composition of claim 4.

* * * * *